Dec. 5, 1967 M. C. TATE ETAL 3,356,169
BATCH WEIGHER WITH RESPECTIVE DIALS FOR
SUCCESSIVE LOADS AND TOTAL WEIGHT
Filed April 1, 1966 5 Sheets-Sheet 1

INVENTORS.
Malcolm C. Tate
Chester D. Bradley
BY
Blair, Buckles & Cesari
ATTORNEYS.

Dec. 5, 1967  M. C. TATE ETAL  3,356,169
BATCH WEIGHER WITH RESPECTIVE DIALS FOR
SUCCESSIVE LOADS AND TOTAL WEIGHT
Filed April 1, 1966  5 Sheets-Sheet 4

United States Patent Office 3,356,169
Patented Dec. 5, 1967

3,356,169
BATCH WEIGHER WITH RESPECTIVE DIALS FOR SUCCESSIVE LOADS AND TOTAL WEIGHT
Malcolm C. Tate, Stamford, and Chester D. Bradley, Darien, Conn., assignors to A. H. Emery Company, New Canaan, Conn.
Filed Apr. 1, 1966, Ser. No. 539,525
14 Claims. (Cl. 177—17)

ABSTRACT OF THE DISCLOSURE

A weighing apparatus for batch weighing operations, and having two dials, each with an associated pointer. One dial records the magnitude of successive loads and the other records the total weight of a number of such loads; the former dial rotates through a plurality of revolutions to greatly increase effective scale length. In operation, a load applied to a load cell actuates a Bourdon tube which controls a pneumatic circuit to operate a force balance system having a fluid motor. Movement of the fluid motor through appropriate gears rotates the apparatus dials. Pneumatically operated control devices provide for actuation of external batching apparatus at predetermined load magnitudes through baffle and nozzle sensing means, the baffle being operated by movement of the fluid motor. Means are provided to simulate loading on the apparatus to test the control devices.

---

This application is a continuation-in-part of an earlier filed application in the name of Malcolm C. Tate, Ser. No. 334,233 filed Dec. 30, 1963, now Patent No. 3,269,473, issued Aug. 30, 1966.

It is desirable in weighing apparatus to have a high degree of sensitivity and accuracy over a wide load range. Whereas weighing apparatus having a relatively accurate loading response over a wide load range have been developed, the overall or net accuracy of these apparatus has been limited by the accuracy of the mechanism employed to translate the response of the apparatus to a readable indication of the actual weight of the load. Thus, for example, the dial and pointer arrangement customarily employed to visually display the apparatus response as an actual numerical weight is severely limited by the size of the dial and the accuracy with which the location of the tip of the pointer relative to the dial graduations can be visually ascertained.

In an attempt to solve this problem, the dials have been increased in physical dimensions to increase the circumferential length of the scale and thereby increase the accuracy with which the scale can be read. Such larger dials, however, are expensive to manufacture and, perhaps more importantly, they considerably increase the overall size of the weighing apparatus and make it extremely cumbersome.

An attempt has also been made to solve this problem by arranging the indicating mechanism so that the pointer makes a plurality of complete revolutions in response to receipt of a full capacity load, whereby the effective scale length is increased as the multiple of the number of such revolutions. Such an arrangement, however, is undesirable in that it places upon the operator the burden of remembering which revolution the pointer is in at any given instant and thereafter multiplying the number of complete revolutions undergone by the scale capacity per revolution, and adding to that product the actual reading of the pointer.

It is also desirable in weighing apparatus to provide means whereby a predetermined program of operations relating to the weighing operation being performed may be selectively pre-set by the operator. Such programming means is not available in known weighing apparatus or, if available, is unsatisfactory because of its complexity, difficulty of operation, inaccuracy and/or lack of versatility.

In the chemical and food processing industries, for example, weighing apparatus is often used in connection with batch processing equipment. In such equipment, a plurality of individual batches of different ingredients are added to a batching tank for processing. In such applications, it is desirable to have weighing apparatus which indicates the weight of each individual ingredient added to the batching tank, while at the same time indicating the cumulative weight of all ingredients in the batching tank so that the operator can determine the stage to which the batching operation has progressed.

Accordingly, it is an object of the present invention to provide an improved weighing apparatus.

It is a more specific object to provide a weighing apparatus having a high degree of accuracy over a wide load range.

It is a yet more specific object to provide an indicator mechanism for use in a weighing apparatus which will accurately display the magnitude of loads varying in magnitude over a wide range.

It is a further object to provide a weighing apparatus having improved means whereby a predetermined program of operations relating ot the weighing operation being performed may be selectively pre-set by the operator.

It is a more specific object to provide, in a weighing apparatus having programming means as aforesaid, means for simulating a load on the apparatus, whereby to check the accuracy of the programming prior to the commencement of the weighing operations for which the program has been selected.

It is a further object to provide weighing apparatus of the above character which will indicate the magnitude of individual loads as well as the cumulative magnitude of a number of such loads.

It is a still further object to provide weighing apparatus of the above character capable of automatically adjusting to fluctuations in ambient temperature.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
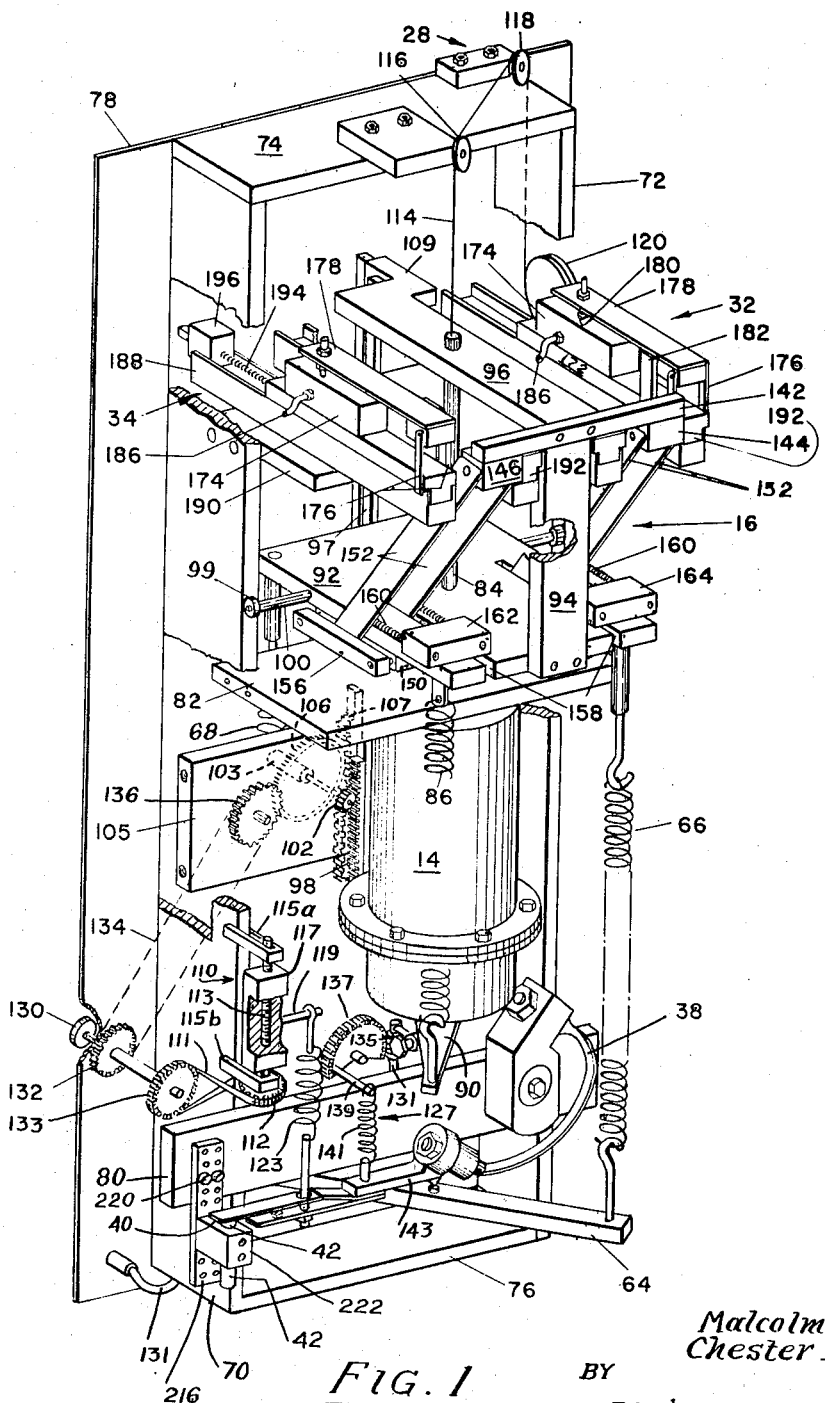
FIGURE 1 is a rear isometric view of a weighing apparatus embodying features of the present invention.

The weighing apparatus of the invention, broadly considered, comprises a load receiving surface 10, provided for example by the load receiving face of a hydraulic load cell 12, a motor 14, an assembly, generally indicated at 16, driven by the motor 14, and means indicated generally at 18, which are operative in response to placement of a load on the surface 10 to actuate the motor 14 in a direction and to an extent to drive the assembly 16 through a distance proportional to the magnitude of the load on the surface 10. The assembly 16 drives by suitable means a load indicating pointer 20 which coacts with a fixed scale 22 to visually display the magnitude of the load.

According to one feature of the invention, the drive means between the assembly 16 and the pointer 20 are selected so as to rotate the pointer through a plurality of complete revolutions in response to receipt of a full capacity load and separate masking and number dials, 21 and 24 respectively, are provided. The masking dial is provided with a series of windows 26 arranged about the axis of the pointer and the number dial is mounted behind the masking dial for rotation about the pointer axis. Drive means, indicated generally at 28, are provided to continually rotate the number dial, during rotation of the pointer, at an angular speed which is proportional to and a fraction of the angular speed of the pointer, and the number dial is provided with a plurality of separate numerically ascending series of numbers corresponding in number to the number of revolutions of the pointer under full capacity load.

The arrangement of the number series on the number dial and the relative angular speeds of the number dial and pointer are selected so that during one revolution of the pointer the successive numbers of one of the number series are successively displayed through successive windows in the masking dial upon arrival of the pointer at each window, and upon each successive revolution of the pointer the numbers of a successive number series are similarly displayed. The effective length of the scale 22 is thus multiplied by the number of revolutions of the pointer under full capacity load, so that an accurate indication of the load magnitude is provided over a wide load range, and the load weight corresponding to the position of the pointer is numerically displayed to the operator for any position of the pointer in any of its several revolutions.

Figure 2:
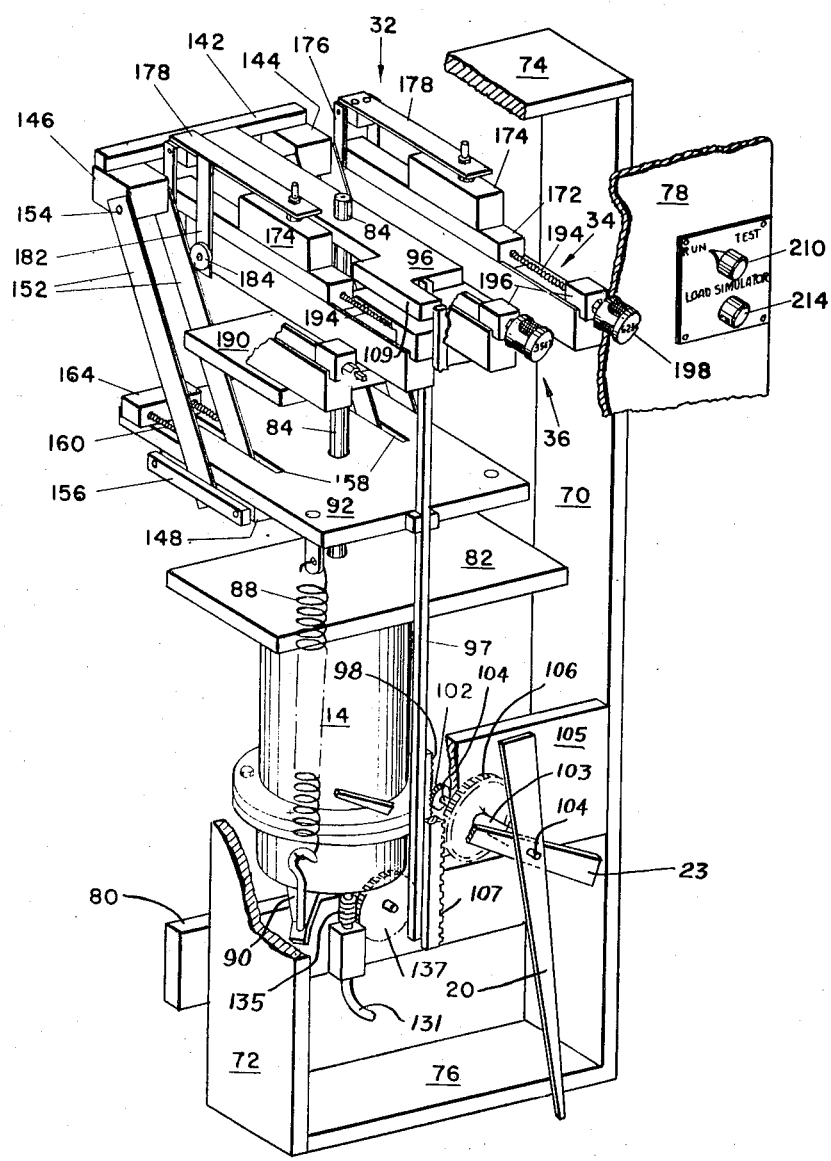
FIGURE 2 is a front isometric view of the weighing apparatus of FIGURE 1.
Figure 5:
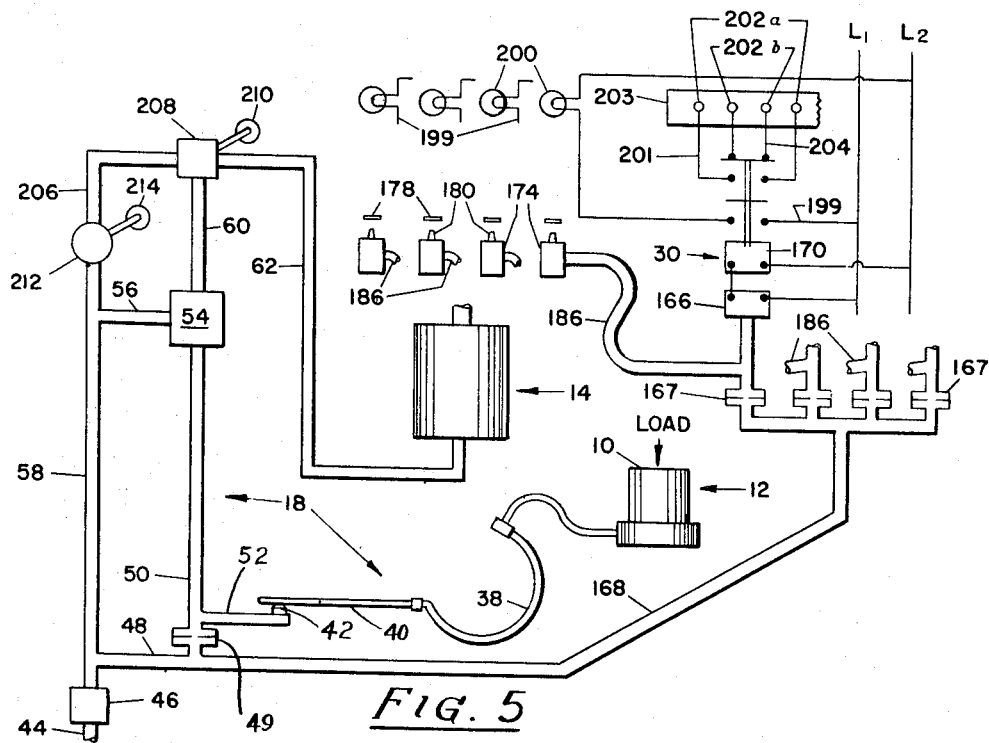
FIGURE 5 is a diagrammatic view of the apparatus showing fluid and electrical circuitry for use therewith.

According to a further feature of the invention, a control device indicated generally at 30 in FIG. 5 is provided and is operable when actuated to generate a control signal. Means, indicated generally at 32, in FIGS. 1 and 2, are provided which are operative in response to movement of the assembly 16 through a predetermined distance to actuate the control device 30, and adjusting means indicated generally at 34, are provided for selectively varying the extent of assembly travel required to actuate the control device 30 and thereby vary the angular position of the pointer 20 at which that device 30 is actuated. Means, indicated generally at 36, are provided to visually indicate, for any position of adjustment of the adjusting means 34, the angular position of the pointer and thereby the load magnitude at which that control device will be actuated to generate its control signal. By the provision to a plurality of such control devices, each with its own actuating, adjusting, and indicating means, the operator may collectively set the various control devices according to a particular loading program so that during a loading operation they will generate a plurality of control signals at a plurality of distinct and predetermined load magnitudes.

The means 18 for actuating the motor 14 in response to the load on the surface 10 includes a Bourdon tube 38 connected at one end to the output of the load cell 12; a baffle 40 secured to the other or free end of the Bourdon tube; a nozzle 42 opening adjacent the lower face of the baffle and continually supplied with air under pressure through a conduit 44, pressure regulator 46, conduit 48, orifice 49, and conduits 50 and 52; a direct amplifying air relay valve 54 connected to the nozzle 42 through conduits 50 and 52 and to regulator 46 by the conduits 56 and 58; conduits 60 and 62 connecting the valve 54 to the motor 14; a cross piece or yoke 64 underlying and bearing at its approximate midpoint against the free end of the Bourdon tube 38; and force balance springs 66 and 68 secured at their one ends to the opposite ends of the yoke 64 and at their other ends to spaced locations on the assembly 16.

In the disclosed embodiment, the various elements of the weighing apparatus are mounted either directly or indirectly on a cabinet frame including vertical side plates 70 and 72, horizontal top and bottom plates 74 and 76 and a face plate 78. The Bourdon tube 38 and nozzle 42 are mounted at spaced locations on a vertically disposed cross plate 80 spanning the vertical plates 70 and 72 adjacent their lower ends, and the motor 14, which preferably is in the form of a fluid pressure cylinder of the rolling diaphragm type, is secured at its top face to a horizontally disposed cross plate 82 butted between the plates 70 and 72 on a location on the latter substantially midway of their height.

Increase of internal pressure in Bourdon tube 38 due to increase of the load on the cell 12 causes expansion of the tube and accordingly moves baffle 40 downwardly toward nozzle 42. Such movement of baffle 40 increases the pressure in conduit 52. The relay 54 senses this pressure increase and amplifies it in known manner to a pressure increase in lines 60 and 62, thereby increasing the pressure in motor 14 and causing upward movement of the piston rod 84 of that motor.

The rod 84 is connected to and drives the assembly 16 so that the assembly is moved upwardly to extend the springs 66 and 68 and thereby increase the upward force exerted on the free end of the Bourdon tube through the yoke 64. The free end of the tube is thus moved upwardly so that the baffle 40 moves away from nozzle 42 permitting a free flow of air from nozzle 42 and decreasing the air pressure in the conduit 52. The baffle 40 is not restored to precisely its initial position but to a position where the pressure in conduit 52 will not be further increased and hence a balanced relation is obtained at the free end of the Bourdon tube between the upward force exerted by the springs 66 and 68 and the downward force of the fluid pressure acting in the Bourdon tube. During this balancing operation, the piston rod 84 and the assembly 16 driven thereby undergo a relatively large increment of movement compared to the relatively minute increment of movement undergone by the free end of the Bourdon tube, this being accomplished by reason of the elasticity of the springs 66 and 68. The motor 14 is preferably maintained, under no load conditions, in a live condition, i.e., a condition in which the piston is precariously balanced by the air pressure acting on its lower face and the spring pressure acting on its upper face through the piston rod, so that it will quickly respond even to slight changes in the load magnitude. The springs 66 and 68 are chosen to have a substantially straight line stress-strain relation so that the movement undergone by the piston rod 84 and assembly 16 for any increase of the load on the cell 12 is proportional to the magnitude of that load increase. It will be understood that a decrease of the load on cell 12 will produce an action the reverse of that described above, the Bourdon tube contracting to move the baffle 40 upwardly to decrease the pressure in conduit 52 and, through the action of relay 54, correspondingly decrease the pressure in the motor 14 to allow the piston rod 84 and assembly 16 to be lowered under the action of motor return springs 86 and 88, whereby to reduce the tension of the springs 66 and 68 and the force exerted by the latter on the free end of the Bourdon tube.

The motor return springs 86 and 88 are secured at their respective lower ends to the opposite ends of a cross piece 90 disposed below and supported by the motor 14 and at their respective upper ends are secured to diagonally opposite corners of a plate 92 forming a part of the assembly 16. The force balance springs 66 and 68 are secured to the other diagonally opposite corners of plate 92.

The assembly 16 further includes a post 94 extending upwardly from the rear edge of the plate 92, a bar 96 secured to the upper end of post 94 and extending forwardly from the latter, and a rod 97 depending from the forward end of the bar 96 and carrying at its lower end a rack 98. The piston rod 84 passes slidably through the cross plate 82 and passes through and is secured to the plate 92 and the bar 96. Rollers 99 carried on shafts 100 extending from opposite sides of the plate member 92 rollably engage the rear edge faces of the cabinet plates 70 and 72 to guide and prevent twisting of the assembly 16 as it is moved upwardly or downwardly in response to actuation of motor 14.

A pinion gear 102 is provided for coaction with the rack 98. The pinion 102 is secured to one end of a pin shaft 104 rotatably mounted in a brace plate 105 secured to the rear of face plate 78. The shaft 104 passes through brace plate 105 and face plate 78 for connection at its other end to pointer 20 which is thus rotatably driven upon actuation of motor 14, with the various drive ratios and part dimensions being selected so that pointer 20 is driven through a plurality of revolutions in response to placement of a full capacity load on the load cell 12.

The scale 22 for coaction with pointer 20 is circularly arranged on the face plate 78 concentric with the axis of shaft 104.

The number dial 24 comprises a disc mounted for rotation about the axis of the shaft 104 and the masking dial 21 comprises a disc of the same approximate diameter as dial 24. Dial 21 is disposed in a position concentric with shaft 104 and forwardly of and thus overlying the dial 24. The series of windows 26 provided on the masking dial are spaced equally around the periphery of that dial. In the disclosed embodiment, the windows 26 are in the form of radially extending slots opening at the periphery of the dial.

The number dial 24, as previously indicated, is provided at its periphery edge with a plurality of separate numerically ascending series of numbers with the number of such series being equal to the number of revolutions of pointer 20 under full capacity load. For example, and as shown, the pointer may be arranged to make five complete revolutions under full capacity load and the number dial 24 thus being provided with five separate number series.

The number dial is continuously rotated during rotation of the pointer at an angular speed which is proportional to a fraction of the angular speed of the pointer. The number dial is driven in the disclosed embodiment by a cable and pulley system including a cable 114 secured at its one end to the upper end of the piston rod 84, idler pulleys 116 and 118 mounted on the upper cabinet plate 74 and over which the cable 114 is passed, a relatively large diameter pulley 120 rotatably mounted on the cabinet side plate 72 and to the peripheral surface of which the other end of the cable 114 is secured, a relatively small diameter pulley 121 coaxially secured to the pulley 120, a cable 122 secured at its one end to the peripheral surface of the pulley 121, a pin 124 secured to the rear face of number dial 24 and projected from that face rearwardly through an oversize aperture 125 in the face plate 78 for securement to the other end of the cable 122, and a spring 126 secured to the pin 124 to maintain the cables 114 and 122 in a continuously taut condition.

Figure 4:
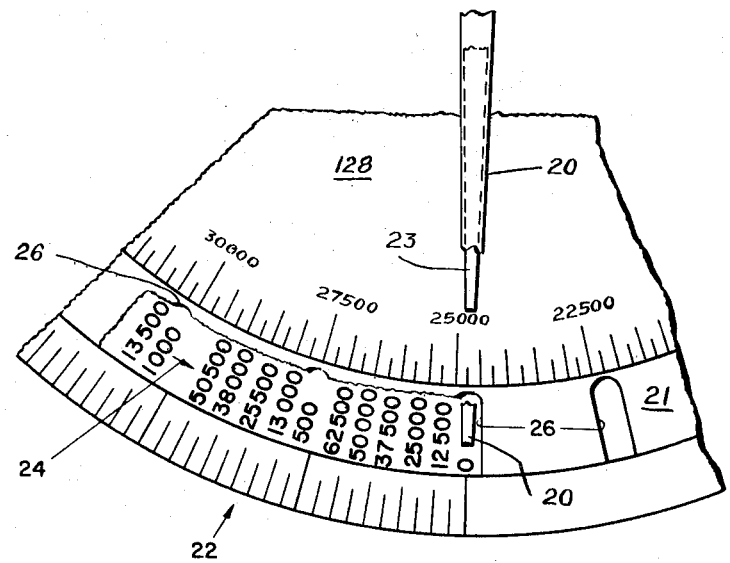
FIGURE 4 is a view of an enlarged scale of a portion of the apparatus as shown in FIGURE 3.

The number series on the number dial are arranged so that a separate group of numbers is associated with and adjacent each window in the masking dial, with each group of numbers including one number from each of the number series arranged in descending order in the direction of rotation of the number dial. The numbers in the group associated with the first window, measured in the direction of rotation of the pointer from its rest position, comprise the lowest number in each of the number series and the groups adjacent each subsequent window are similarly constituted of a number from each of the number series corresponding in position in its series to the position of the window in its series. Thus, for example, where the pointer is designed to complete one revolution for each 12,500 lbs. of load and to undergo five complete revolutions under full capacity load, giving a full load capacity of 62,500 lbs., and where the windows 26 are 25 in number, the numbers will be arranged on the number dial as shown in FIG. 4, it being understood that peripheral portions of the masking dial between successive windows have been broken off in that figure to show complete number groups.

Thus, associated with the first window is the number group 0–12500–25000–37500–50000–62500, with the second window the number group 500–13000–25500–38000–50500, etc. With pointer in its rest or no load position, centered on the first window, the number 0 appears centered within that window. The number 500 appears slightly to the left of center in the second window, the number 1000 appears somewhat more to the left, and partially obscured, in the third window, etc. When a load is placed on the cell 12, the pointer commences to move clockwise and the number dial commences to move counterclockwise at an angular speed relative to that of the pointer such that by the time the pointer is centered on the second window the number 500 is centered in that window and by the time the pointer has reached the third window the number 1000 is centered in that window, the lowest number of each successive group centering itself in each successive window as the pointer continues around in its first revolution until, having completed that revolution and moving again into a position centered on the first window, the number dial has moved to center the lowest number of the second number series, i.e., 12500, in the first window. This counter and timed rotation of the number dial continues for as long as the pointer rotates so that when the pointer finally stops, whether in its first, second or some succeeding revolution, the number displayed in the window next adjacent the pointer represents the numerical magnitude of the load producing the cumulative angular displacement of the pointer so that the operator need not concern himself with keeping track of the number of revolutions which the pointer has at any instant undergone and thereafter calculating the actual weight.

A third dial 128 is mounted in front of the masking dial 21 for rotation about the axis of the pin shaft 104. Such rotation of the dial 128 is accomplished by turning of a knob 130 on the lower right hand corner, as viewed in FIG. 3, of the face plate 78. Turning knob 130 rotates a sprocket 132 behind the face plate, the sprocket 132 driving a chain 134 which in turn drives a sprocket 136 rotatably mounted on brace plate 105 at a location thereon spaced from pin shaft 104. The sprocket 136 drives a pinion gear 138 engaging a gear 139 concentrically secured to the rear face of dial 128. A scale 140 is provided around the peripheral edge of dial 128 and indicia are provided on the scale ranging from 0 to the maximum weight magnitude which the weighing apparatus will register, in the disclosed embodiment, 62,500 lbs.

Figure 3:
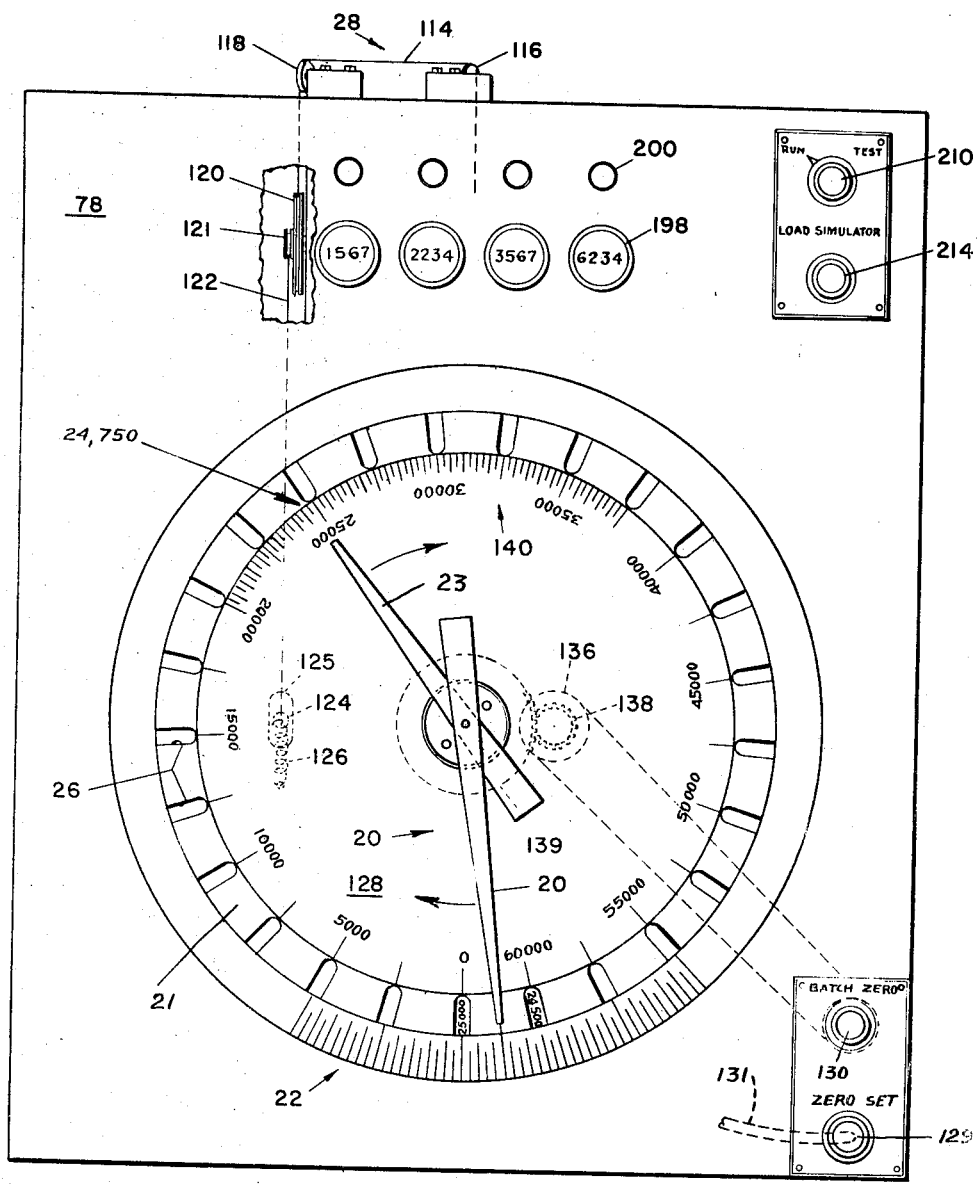
FIGURE 3 is a front elevational view of the apparatus.

As shown in FIGURES 2 and 3, a second pointer 23, which coacts with scale 140 in a manner more fully described hereinafter, is rotatably mounted on a sleeve 103. Sleeve 103 is coaxial with shaft 104 (FIGS. 1 and 2) and is secured to a pinion gear 106 positioned in front of brace plate 105 (FIG. 2). Pinion gear 106 is engaged by rack 107 which is connected by rod 108 to an extension 109 of bar 96. Thus, as assembly 16 moves upwardly in response to a load applied to cell 12, rack 107 is moved upwardly causing pinion gear 106 and attached pointer 23 to revolve in a clockwise direction as viewed in FIGURE 2.

In the embodiment illustrated, pinion gear 106 has a diameter five times as large as the diameter of pinion gear 102. Thus, in response to a maximum load of 62,500 pounds applied to cell 12, pointer 23 will make one complete revolution while pointer 20 makes five complete revolutions.

The dial 128 may be termed a "contents dial" since in combination with pointer 23, it enables the operator to determine the total weight of the contents of a batching tank, as registered on cell 12, by a "batch zero" mechanism illustrated generally at 110 in FIGURE 1. A sprocket 133 is mounted coaxially to the same shaft with sprocket 132. A chain 111 interconnects sprocket 133 and sprocket 112. Sprocket 112 is connected to threaded shaft 113 which is supported by brackets 115a and 115b secured to side plate 70. A threaded block 117 is mounted between brackets 115a, 115b on shaft 113 in threaded engagement therewith. A stud 119 extends from the side of block 117 and spring 123 depends therefrom secured to baffle 40 at its opposite end.

The "batch zero" mechanism operates in the following manner. Assume that a load of 24,750 pounds has been batched into a batching tank on load cell 12. In response to this load, pointer 20 will have rotated through one complete revolution and the major part of a second revolution and will indicate 24,750 pounds on scale 22 as shown in FIGURE 3. At the same time, pointer 23, being actuated by pinion gear 107 which is five times the size of pinion gear 102 actuating pointer 20, will have rotated through slightly less than ⅖ of one revolution and will indicate 24,750 pounds on scale 140. Before the operator batches in a second ingredient, the batch zero knob 130 on the face plate 78 is turned in a clockwise direction as viewed in FIGURE 3, thus turning sprockets 132 and 133. As sprocket 133 rotates, chain 111 causes sprocket 112 to rotate turning threaded shaft 113 and causing block 117 to move in an upward direction. Thus, the tension on spring 123 is increased and a force is exerted on Bourdon tube 38 which is opposite to and counteracts the internal pressure in Bourdon tube 38 resulting from the load on cell 12. As the knob 130 is turned further, the tension in spring 123 increases until the force exerted thereby on Bourdon tube 38 exactly overcomes the internal pressure. Baffle 40 is thus moved away from nozzle 42 decreasing the air pressure therein and causing a drop in pressure in motor 14 and a subsequent downward movement of assembly 16. In response to the movement of assembly 16, pointers 20 and 23 and dial 24 will return to the zero load position shown in FIGURE 4, which is the position of the pointers in the absence of a load on cell 12.

Knob 130 turns sprocket 132 driving chain 134 and sprocket 136 to rotate dial 128 in a counterclockwise direction as viewed in FIGURE 3. The sprockets 132 and 136 correlate the movement of dial 128 with the movement of pointer 23 so that the two move together in the same direction. Thus, as shown in FIGURE 4, when pointer 23 reaches the zero load position, it is still in registry with the reading 24,750 pounds on scale 140, which is returned with the pointer 23 to provide continued indication of the total contents in the tank.

At this point, the apparatus is ready for the batching in of another ingredient to the batching tank. Pointer 20 and dial 24 begin moving from a zero reading and will thus indicate the weight of the new ingredient added. Pointer 23, however, will begin moving from a setting of 24,750 pounds and will indicate the total weight of all ingredients in the batching tank.

By means of the multiple pointer and dial arrangement, and the batch zero mechanism, the operator can continuously read the total weight of all ingredients added to the batching tank and, at the same time, the weight of each individual ingredient as it is added. Knowing the total weight added enables the operator to continuously and accurately monitor the batching operation.

When a batch process has been completed and all material removed from the batching tank, the weighing apparatus is re-set by means of the "zero set" mechanism illustrated generally at 127 in FIGURE 1. A knob 129 on the face plate 78 (FIG. 3) is connected by flexible shaft 131 to worm 135 (FIGS. 1 and 2). A rotatable worm wheel 137 engages worm 135 and has a stud 139 projecting therefrom. A spring 141 depends from stud 139, the opposite end thereof being secured to an extension 143 of Bourdon tube 38. By turning knob 129, the operator can rotate worm wheel 137 in a clockwise direction as viewed in FIGURE 1 thus increasing the tension exerted by spring 141 on Bourdon tube 38. Increased tension in spring 141 will counteract the internal pressure in Bourdon tube 38 in the same manner as does increased tension on spring 123 of batch zero mechanism 110. Thus, by means of zero set mechanism 127, pointers 20 and 23 and dial 24 can be re-set to a zero load position. Zero set mechanism 127 differs in function from batch zero mechanism 110 in that it does not move dial 128.

To re-set the weighing apparatus for a new batching process once the load has been removed from load cell 12, zero set knob 129 is turned until pointer 23 is positioned at zero on scale 140. Then, batch zero knob 130 is turned until pointer 20 is positioned at the number zero on number dial 24. At this point, in the embodiment illustrated, both pointers 20 and 23 are pointed vertically downward and the number zero on scale 140 is aligned with the number zero appearing in the window directly under pointer 20.

The assembly 16 further includes a bar 142 secured to the upper end of the post 94 and extending transversely from both sides of that post. Blocks 144 and 146 are secured to the underside of the bar 142 adjacent its respective ends and blocks 148 and 150 are secured to the underside of the plate 92 adjacent its respective sides. Four cam plates 152 are pivotally secured, one to each side face of each block 144 and 146, as by screws 154. The cam plates 152 depend from the blocks 144 and 146 and are releasably clamped adjacent their lower ends against the opposite faces of the blocks 148 and 150 by clamping bars 156. The outer cam plates pass adjacent the respective opposite sides of the plate 92 and the inner cam plates pass through slots 158 in that plate. Screws 160 threaded into blocks 162 and 164 secured to the upper side of the plate 92 bear against the rear edge of each cam plate.

There are as many control devices 30 as there are cam plates, in this case, four. Each control device 30, only one of which is shown, includes a pressure switch 166 of known form. Each switch 166 is supplied with air under pressure through an orifice 167 in a conduit 168 communicating with the conduit 48 and is operative in response to a drop in the air pressure in conduit 186 to close a circuit to a relay 170.

The means 32 for actuating each control device includes a block 172, a block 174 secured to the top surface of block 172, pedestals 176 upstanding from the rear of block 172, a baffle plate 178 pivotally mounted at its rear end between the pedestals 176 and overlying at its free end a nozzle 180 carried by the block 174, an actuator arm 182 secured at its upper end to baffle plate 178 intermediate the ends of the latter and a cam roller 184 rotatably mounted on the free lower end of arm 182 in the place of upward movement of a respective one of the cam plates 152.

A flexible conduit 186 communicates at one end with the conduit 168 and at its other end with a bore in block 174 which in turn communicates with nozzle 180. It will be seen that as assembly 16 is moved upwardly by motor 14 in response to imposition of a load on cell 12, each cam plate at a point in its upward movement determined by the forward-rearward position of cam roller 184, will engage the respective roller 184 to pivot the free end of the baffle plate upwardly away from the nozzle 180, whereby to drop the pressure in conduit 186 in the portion of conduit 168 above orifice 167 and thereby trip pressure switch 166 to actuate relay 170.

The adjusting means 34 for each control device comprises a ground track 188 supported on a cross plate 190 butted between the cabinet plates 70 and 72. Each track 188 slidably receives a tongue 192 provided on the lower portion of block 172, and a screw 194 is passed through a block 196 mounted in the face plate 78, and is threaded axially into block 172. By turning screw 194, the block 172 is moved axially along track 188 to vary the position of cam roller 184 relative to the related cam plate 152 and thereby vary the extent of upward travel of assembly 16 required to actuate the related control device 30. Since each block 172 may be adjusted independently of each other block, each control device may be pre-set to fire at the point in the upward travel of assembly 16 entirely independent of the setting of each other control device.

The indicating means 36 for each control device comprises a digital counter 198 secured to the free end of screw 194. The counter 198 is actuated by turning of the screw and displays a number at all times proportional to the number of turns undergone by the screw. This counter may take varying forms, one such form, and the form shown, comprising a series 1300 Borg Micro Dial available from Amphenol-Borg Electronic Corp. of Broadview, Ill. This counter includes a series of side by side number discs each carrying numbers from 0–9 and each turned in response to rotation of screw 194 at a speed which is $\frac{1}{10}$ that of the next adjacent disc on its one side and 10 times that of the next adjacent disc on its other side, the counter thus operating much in the manner of a motor vehicle odometer. The pitch of screw 194 and the slope of camplates 152 are selected so that the number displayed on the counter for any position of the cam roller 184 corresponds to the weight measure which the pointer end 20a will indicate on scale 22 at such time as cam roller 184 is engaged and displaced to actuate the related control device. That is, the control device will fire at such time as the load imposed on the load cell reaches the numerical magnitude displayed by the digital counter 198.

The operator may thus pre-set the various control devices according to any desired program of operations to be performed in relation to the contemplated weighing operation. The program which may thus be set up is essentially limitless. Further, once a particular program is set up, it will be automatically and precisely repeated for each successive weighing operation. It is to be understood that numerical correspondence between the numbers on the counter and the number indicated by the pointer is initially achieved by loosening the clamping bars 156 and thereafter adjusting the slope of the cam plates by selectively turning screws 160 until the required numerical correspondence is achieved. The cam plates are thereafter clamped in position by tightening of clamping bars 156 and need not again be adjusted during the course of normal operation.

The relay 170 may take any of varying forms depending upon the nature and number of control signals which it is desired to generate upon actuation of the control device. In the form shown, relay 170 has an armature carrying two switch arms with one switch arm arranged to close a circuit 199 to a light 200 mounted in the face plate 78 directly above the related counter 198, whereby to call the operator's attention to the firing of the control device, and with the other switch arm arranged, with the relay energized, to close a circuit 201 to a first set 202a of terminals on a suitable terminal board 203 and, with the relay de-energized, to close a circuit 204 to a second set 202b of terminals on board 203. The user of the weighing apparatus is thus enabled to connect to the terminal set 202 associated with each control device an electrical control apparatus of his own choosing and suiting his own peculiar weighing program requirements. Further, each such control apparatus may be arranged to be normally energized or normally de-energized, depending upon whether the normally open terminals 202a or the normally closed terminals 202b are employed.

The control devices when used in combination with the batch zero mechanism 110, may have relays between terminal set 202 and the electrical control apparatus employed, which may temporarily disable the electrical control apparatus after it has been fired. For example, assume the control devices of the embodiment shown have been pre-set to fire respectively at 1567, 2234, 3567 and 6234 pounds, as in FIGURE 3. Once the control device set at 1567 pounds has fired, the operator will actuate batch zero mechanism 110 lowering assembly 16 to its zero load position. If a disabling relay has not been employed, the control device set at 1567 pounds will again fire before assembly 16 has actuated the control device set to fire at 2234 pounds. Of course, where the control devices are set to fire sequentially at decreasing load magnitudes, disabling relays will not be required. At the end of a batching operation, the disabling relays are reset so that the batching sequence can be repeated.

In order to enable the operator to assure himself that the various control devices will in fact fire during the weighing operation at the load magnitudes indicated by the various counters 198, means are provided to simulate a load on the apparatus. These means include a conduit 206 communicating at one end with conduit 56 and at its other end with one port of a valve 208, two other ports of which are connected to the conduits 60 and 62 respectively. The valve 208 is moved by a knob 210 on the face plate 78 between a run position in which conduits 60 and 62 communicate through valve 208 and a test position in which conduits 206 and 62 communicate and communication between conduits 60 and 62 is blocked. Normally the valve 208 will be in its run position. When, however, it is desired to simulate a load to check the control device settings, the operator need only move the valve 208 to its test position to supply air to the motor through conduits 206 and 62 and run the motor and assembly 16 through their full stroke to fire the control devices. In order to control the extent of movement of the motor and assembly when simulating a load, a pressure regulator 212 is provided in line 206, the regulator being adjustable by turning of a knob 214 on the face plate.

Figure 6:
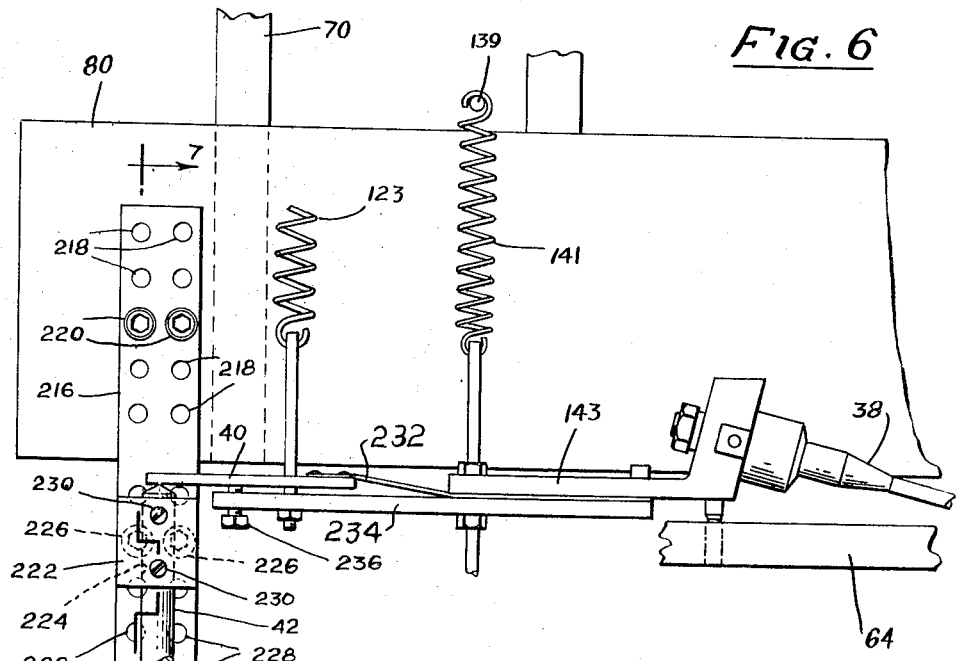
FIGURE 6 is an enlarged rear elevation view of a portion of FIGURE 1 illustrating the temperature compensating nozzle support structure of the invention.
Figure 7:
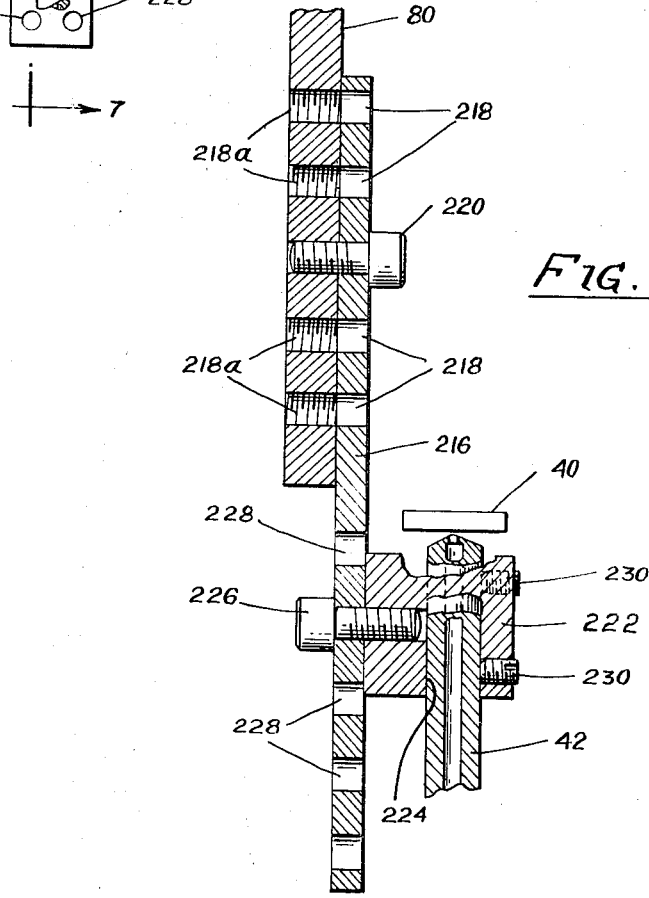
FIGURE 7 is an enlarged sectional view of the nozzle support structure taken along the line 7—7 of FIGURE 6.

It has been found that a rise or fall in the ambient temperature of the weighing apparatus will produce erroneous readings unless temperature compensation is provided. In particular, a rise in temperature produces low readings which are caused by expansion or contraction of the metal parts of the apparatus. To compensate for fluctuations in ambient temperature, the nozzle 42 is mounted to the weighing apparatus as shown most clearly in FIGURES 6 and 7. A bracket 216 having a plurality of adjustment holes 218 is mounted to the rear of cross plate 80 by a pair of cap screws 220 passing through the appropriate set of adjustment holes 218 into a corresponding set of threaded holes 218a in plate 80. The bracket 216 is made from a material which undergoes negligible linear expansion over the ambient temperature range of the weighing apparatus. In other words, the coefficient of linear expansion of the material over the ambient temperature range of the apparatus is very low, approaching zero. The alloy, Invar (comprising about 36% nickel with the balance essentially iron), has proved most successful as a material for the bracket 216, although other metals, alloys or even non-metallic materials may be used. A nozzle block 222 having an aperture 224 is fastened to the depending end of bracket 216 by a pair of cap screws 226. A plurality of adjustment holes 228 are provided along the depending end of bracket 216 for cap screws 226. The nozzle 42, which is formed of a material exhibiting a change in length upon a change in temperature such as aluminum or brass, is held within aperture 224 by a pair of set screws 230, in position to interact with the underside of baffle 40. Baffle 40 is connected to extension 143 of Bourdon tube 38 by a flexible strip 232 secured by bar 234. An adjustment screw 236 passes through bar 234 and abuts the underside of baffle 40. By means of screw 236, the relationship of nozzle 42 and baffle 40 can be adjusted. The negligible expansion of bracket 216 insures a substantially constant separation between cap screws 220 and 226. Upon an increase in ambient temperature, nozzle 42 will expand toward baffle 40. At the same time, expansion of plate 80 produces downward movement of bracket 216 carrying nozzle 42 away from baffle 40 and counteracting, to an adjustable degree, the effect of expansion of nozzle 42. The reverse occurs when the ambient temperature is lowered.

By changing the relative positions of cap screws 220 and 226, various degrees of temperature compensation can be achieved. When cap screws 220 are engaged with the uppermost set of adjustment holes 218, 218a, and cap screws 226 are engaged with the lowermost set of adjustment holes 228, a long length of nozzle 42 protrudes from aperture 224 to reach baffle 40. However, a relatively short length of plate 80 acts to move bracket 216. The expansion of brass nozzle 42 upon an increase in ambient temperature thus substantially exceeds the counteracting downward movement of bracket 216 and a relatively large degree of temperature compensating movement of nozzle 42 toward baffle 40 is achieved.

Conversely, when cap screws 220 engage the lowermost set of adjustment holes 218, 218a, and cap screws 226 engage the uppermost set of adjustment holes 228, the smallest degree of temperature compensating movement of nozzle 42 occurs.

The weighing apparatus of the invention will be seen to provide several important advantages. Because of the long effective scale length, the scale may be accurately read, and because of the timed positioning of the numbers relative to the pointer the operator is relieved of the burden of keeping track of the revolutions undergone by the counter and thereafter multiplying the number of complete revolutions by the scale capacity per revolution and adding to that product the actual reading of the pointer. The use of multiple pointers and dials in combination with a batch zero mechanism enables the operator to accurately determine the magnitude of individual loadings, as well as the cumulative magnitude of a number of such loadings as might occur in a batching operation. Thus, the operator can always determine the stage of the batching process. Further, by use of the plurality of control devices provided, the operator is enabled to pre-set the apparatus according to a precise program so that it will automatically initiate a plurality of operations relating to the weighing operation being performed. Each control device is adjustable over the full range of the weighing apparatus and independently of each other control device. Since motor 14 rather than the Bourdon tube provides the power to rotate the pointer and number dial as well as to actuate the control devices, and since motor 14 has enough power to easily perform all of these functions, the settings of the control devices have no effect on the accuracy of the scale readings.

Further, although the use of a force balance system in a weighing apparatus is generally old, it has been found that the particular force balance system disclosed herein gives results superior to that obtained with the known apparatus of this type. It has been found for example, that a weighing apparatus embodying the particular force balance system disclosed has an overall accuracy of response of 0.05% of capacity, this being so despite the fact that the Bourdon tube employed is generally accurate only to 0.05% of capacity. This accuracy of response, coupled with the high readability provided by the long effective scale length, enable the apparatus of the invention to be used to determine load magnitudes with extremely high accuracy over a large load range. It has further been found that in a weighing apparatus constructed according to the invention the control devices are accurate to 1/6000. Thus, for example, with a scale having as disclosed a capacity of 62,500 lbs. the control device will consistently fire within 10 lbs. of the numerical magnitude displayed by its counter.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. In a weighing apparatus having a load receiving surface, a mechanism movable through a distance proportional to the loading on said surface, and a first movable pointer operably connected to said mechanism to indicate the magnitude of said loading on a first dial means, the improvement comprising:
   (A) a second movable pointer;
   (B) means for proportionately moving said second pointer in response to movement of said mechanism;
   (C) a second dial,
      (1) positioned with respect to said second pointer to indicate a magnitude of loading;
   (D) means for returning said mechanism from its loading position to its position when said surface is free from loading,
      (1) to return said first pointer and said second pointer to their respective zero load positions; and
   (E) means for moving said second dial in correlation with the return movement of said second pointer so that the two move together to maintain their relative positions and the last load indication on said second dial by said second pointer, whereby said first pointer indicates the individual magnitude of each successive loading on said surface while said second pointer simultaneously indicates the sum of the magnitudes of said successive loadings.

2. A weighing apparatus as defined in claim 1 having gearing means for moving said first pointer through a plurality of revolutions and said second pointer through a single revolution in response to a load of predetermined maximum magnitude on said surface.

3. A weighing apparatus as defined in claim 1 wherein said mechanism comprises:
   (A) a movable assembly; and
   (B) a fluid operated pressure sensitive device connected to said assembly for moving said assembly in response to the loading on said surface.

4. A weighing apparatus as defined in claim 3 wherein said fluid operated pressure sensitive device comprises:
   (A) a fluid pressure sensitive motor; and
   (B) a Bourdon tube assembly interconnected with said motor for actuating same in response to the loading on said surface.

5. A weighing apparatus as defined in claim 1 wherein said first and second dials include arcuate scales and wherein said first and second pointers are rotatably mounted to coact with their respective dials.

6. A weighing apparatus as defined in claim 5 wherein said first and second pointers and said first and second dial means are mounted concentrically with respect to one another.

7. A weighing apparatus as defined in claim 5 wherein said first dial means comprises:
   (A) a masking dial having a series of windows arranged about the axis of rotation of said first pointer;
   (B) a number dial mounted behind said masking dial, one of said dials being mounted for rotation about said first pointer axis;

(C) and means operative to continuously rotate said one dial during rotation of said first pointer at an angular speed which is proportional to and a fraction of the angular speed of said first pointer;

(D) said number dial having a plurality of separate numerically ascending series of numbers thereon corresponding in number to the number of revolutions of said first pointer under said maximum load and the arrangement of said number series on said number dial and the relative angular speeds of said one dial and said first pointer being selected so that during one revolution of said first pointer the successive numbers of one of said number series are successively displayed through successive ones of said windows upon arrival of said first pointer at each of said windows and upon each successive revolution of said first pointer the numbers of a successive number series are similarly successively displayed.

8. A weighing apparatus as defined in claim 1 including:
(A) a member moved in response to variation of the load on said surface from a starting position through a distance proportional to the magnitude of said load variation;
(B) a control device operable when actuated to generate a control signal;
(C) pneumatic pressure sensing means operative in response to movement of said member through a predetermined distance from said starting position to actuate said control device;
(D) adjusting means for selectively varying the magnitude of said predetermined distance, whereby to vary the load magnitude at which said signal is generated; and
(E) means visually indicating, for any portion of adjustment of said adjusting means, the load magnitude at which said signal will be generated.

9. A weighing apparatus as defined in claim 8 wherein:
(A) there are a plurality of such control devices and pneumatic pressure sensing means, and adjusting means as aforesaid are provided for each control device;
(B) each such adjusting means being operable to independently vary the magnitude of said predetermined distance of member movement for actuation of its control device without varying such distance for any of the other devices;
(C) and wherein a separate visually indicating means as aforesaid is provided for each control device, whereby said control devices may be collectively set to generate a plurality of control signals at a plurality of distinct and predetermined load magnitudes.

10. A weighing apparatus as defined in claim 9 and further including
(A) means for moving said member as aforesaid independently of the magnitude or presence of a load on said surface, whereby prior to actual weighing operation said control devices may be set and the reading of said visually indicating means for each control device compared for accuracy with the load magnitude displayed by said first pointer.

11. In a weighing apparatus having a load receiving surface, a mechanism movable through a distance proportional to the loading on said surface, and a first rotatably mounted pointer operably connected to said mechanism to indicate the magnitude of said loading on a first dial having an arcuate scale, the improvement comprising:
(A) a second rotatably mounted pointer;
(B) means for proportionately rotating said second pointer in response to movement of said mechanism;
(C) a second dial,
(1) having an arcuate scale, and
(2) positioned with respect to said second pointer to indicate a magnitude of loading;
(D) gearing means for moving said first pointer through a plurality of revolutions and said second pointer through a single revolution in response to a load of predetermined maximum magnitude on said surface.
(E) means for returning said mechanism from its loading position to its position when said surface is free from loading,
(1) to return said first pointer and said second pointer to their respective zero load positions; and
(F) means for moving said second dial with respect to said second pointer to maintain the last load indication on said second dial by said second pointer.

12. A weighing apparatus having a load receiving surface, a fluid operated pressure sensitive device actuated in response to loading on said surface, and indicator means responsive to actuation of said device for indicating the magnitude of said loading, wherein said fluid operated pressure sensitive device comprises:
(A) a pneumatic nozzle;
(B) a baffle,
(1) spaced from the tip of said nozzle, and
(2) movable toward said nozzle tip to increase the pressure in said nozzle in response to an increase in loading on said surface;
(C) direct amplification means,
(1) connected to said nozzle for amplifying the increase in pressure produced therein by movement of said baffle;
(D) means interconnecting said direct amplification means and said indicator means and responsive to said amplified pressure for actuating said indicator means; and
(E) a temperature compensating support structure for said nozzle comprising,
(1) a bracket formed of a material having a negligible coefficient of linear expansion over the ambient temperature range of said weighing apparatus;
(2) means for adjustably securing one end of said bracket to a predetermined length of the frame of said weighing apparatus; and
(3) means for adjustably securing said nozzle to a predetermined point along the length of said bracket in position to interact with said baffle, whereby upon an increase in said ambient temperature, said nozzle expands toward said baffle to counteract the effect of expansion by other portions of said weighing apparatus.

13. A weighing apparatus as defined in claim 12 wherein said bracket material is an alloy comprising about 36% nickel, the balance being essentially iron and said nozzle is made of a material having a substantially greater coefficient of linear expansion than said alloy.

14. In a weighing apparatus having a load receiving surface, a mechanism movable through a distance proportional to the loading on said surface, and a first rotatably mounted pointer operably connected to said mechanism to indicate the magnitude of said loading on a first dial having an arcuate scale, the improvement comprising:
(A) a second rotatably mounted pointer;
(B) means for proportionately rotating said second pointer in response to movement of said mechanism;
(C) a second dial,
(1) having an arcuate scale, and
(2) positioned with respect to said second pointer to indicate a magnitude of loading;
(D) gearing means for moving said first pointer through a plurality of revolutions and said second pointer through a single revolution in response to a load of predetermined maximum magnitude on said surface.
(E) means for returning said mechanism from its loading position to its position when said surface is free from loading,
(1) to return said first pointer and said second pointer to their respective zero load positions; and
(F) means for moving said second dial in correlation with the return movement of said second pointer so that the two move together to maintain their relative positions and the last load indication on said second dial by said second pointer, whereby said first pointer indicates the individual magnitude of each successive loading on said surface while said second pointer simultaneously indicates the sum of the magnitudes of said successive loadings.

References Cited

UNITED STATES PATENTS

| | | | |
|---|---|---|---|
| 515,953 | 3/1894 | Dickson | 177—17 |
| 1,225,387 | 5/1917 | Winters et al. | 177—17 X |
| 1,278,788 | 9/1918 | Theobald | 177—173 X |
| 2,325,345 | 7/1943 | Tate | 177—1 X |
| 2,331,871 | 10/1943 | Tate | 177—208 X |
| 2,357,272 | 8/1944 | Tate | 177—208 |
| 2,549,704 | 4/1951 | Noble | 177—70 |
| 2,634,082 | 4/1953 | Knobel | 177—116 |
| 2,751,180 | 6/1956 | Howard | 177—50 |
| 3,087,652 | 4/1963 | Smith | 222—55 |
| 3,092,072 | 6/1963 | Strimel | 116—129 |

FOREIGN PATENTS

| | | |
|---|---|---|
| 663,610 | 5/1960 | Canada. |
| 267,214 | 3/1927 | Great Britain. |
| 575,951 | 3/1946 | Great Britain. |

RICHARD B. WILKINSON, *Primary Examiner.*

R. S. WARD, *Assistant Examiner.*